No. 738,731. PATENTED SEPT. 8, 1903.
A. PATTERSON.
VALVE FOR HYDRAULIC ENGINES OR MACHINERY.
APPLICATION FILED MAR. 30, 1903.
NO MODEL.

Witnesses
Inventor
A. Patterson
Wilkinson & Fisher
Attorneys

No. 738,731.

Patented September 8, 1903.

UNITED STATES PATENT OFFICE.

ANTHONY PATTERSON, OF CARDIFF, ENGLAND.

VALVE FOR HYDRAULIC ENGINES OR MACHINERY.

SPECIFICATION forming part of Letters Patent No. 738,731, dated September 8, 1903.

Original application filed May 13, 1902, Serial No. 107,175. Divided and this application filed March 30, 1903. Serial No. 150,299. (No model.)

*To all whom it may concern:*

Be it known that I, ANTHONY PATTERSON, a subject of the King of Great Britain, residing at Cardiff, in the county of Glamorgan, Wales, England, have invented certain new and useful Improvements in Valves for Hydraulic Engines and Machinery, (Case C;) and I do hereby declare the following to be a full, clear, and exact description of the invention, such as will enable others skilled in the art to which it appertains to make and use the same.

My invention relates to valves for hydraulic engines and for hydraulic machinery. By the improvements in which my invention consists such valves are of increased efficiency because they are more completely water-tight. They are more thoroughly balanced, and hence the wear and tear of the same is reduced. They may be actuated with greater ease and expedition and are under more complete control. They are suitable for very high water-pressures. The valves are less liable to shocks and consequent injury to themselves and the engines or machines in connection with which they are fitted and in the operation of which they are employed.

This application is a division of my previous application, Serial No. 107,175, filed May 13, 1902. The valve shown in this divisional application is a starting and regulating valve of the single-action type for use in connection with non-reversing engines.

Figure 1:
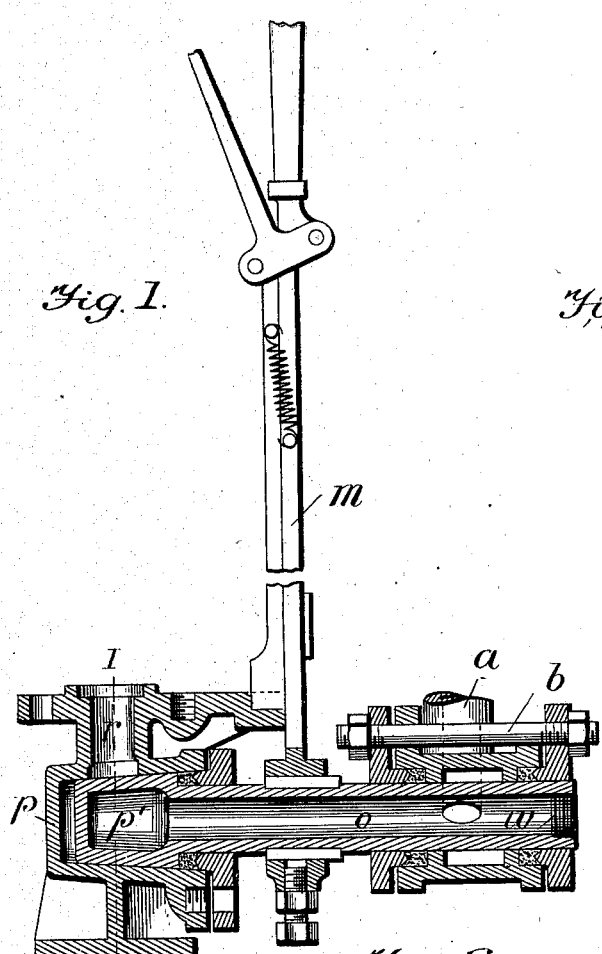
Figure 3:
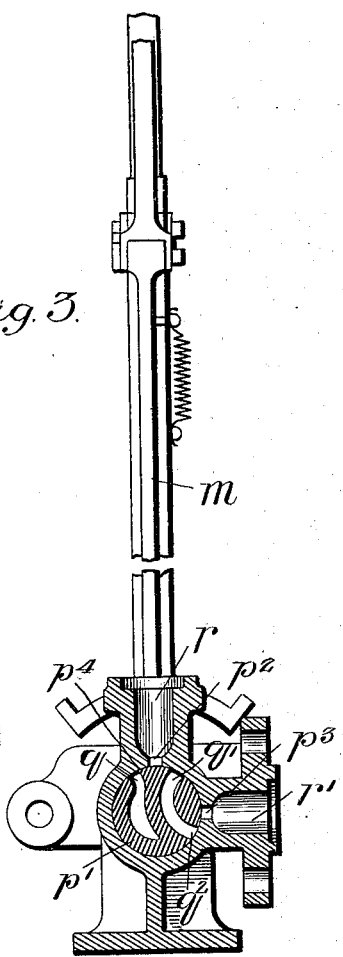
Figure 2:
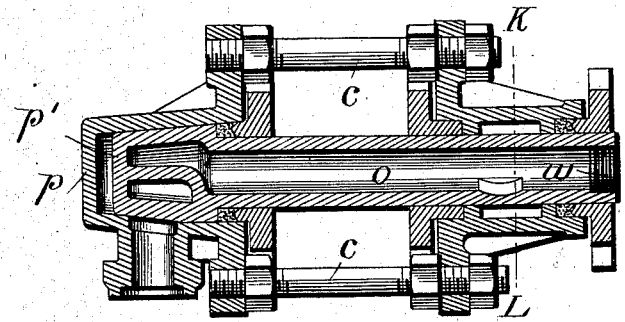
Figure 4:
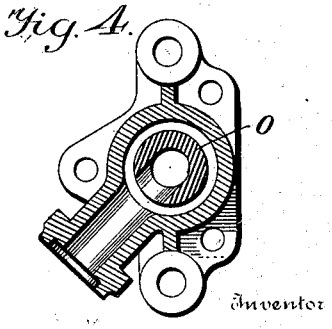

In the accompanying drawings, Figure 1 is a longitudinal section of my improved valve. Fig. 2 is a similar section taken at right angles to the section of Fig. 1. Fig. 3 is a cross-section on the line I J, Fig. 1; and Fig. 4 is a section on the line K L, Fig. 2.

The valve shown in the figures is of the single-ended or one-throated variety.

$o$ represents the throat, to which water is supplied by the pipe $a$, which delivers into said throat at right angles. For convenience in making, the throat $o$ is bored out from one end, and this end is closed by the plug $w$. At the opposite end of the throat is the center piece $p'$, made integrally with said throat and having its outer or left-hand end closed. This center piece is made conical, as shown in Fig. 1, for convenience in assembling the parts. The center piece $p'$ is provided with a chamber $q$ and a passage terminating in the ports $q'$ and $q^2$. Surrounding the center piece is the casing $p$, similar in shape to the center piece $p'$. This casing $p$ has two ports $p^2$ and $p^3$. (Shown plainly in Fig. 3.) Said casing has also two branch connections $r$ and $r'$, one of which, $r$, is connected to the engine or machine which the valve controls, and the other, $r'$, is for the exhaust. These connections are located at right angles to the axis of the valve. The valve is a lap-valve, as shown at $p^4$ in Fig. 3.

$m$ designates the hand-lever for operating the valve and is adjustably secured thereto near its center. It may be held in either one of three positions by the usual rack and detent. (Shown in Figs. 1 and 3.)

Stuffing-boxes are arranged around the point where the supply-pipe $a$ communicates with the throat of the valve and are secured in place by bolts $b$. Similar stuffing-boxes are also provided near the larger end of the center piece $p'$, and the whole structure is bound together by bolts $c$.

The operation will be evident from the foregoing description.

Having thus described my invention, what I claim as new, and desire to secure by Letters Patent of the United States, is—

A single-acting starting and regulating valve for use in connection with non-reversing hydraulic engines, comprising a valve having a long throat and closed at both ends, said valve terminating at one end in a conical center piece, provided with a chamber and a passage, in combination with a supply-pipe delivering into said valve at right angles to its axis, a coupling-box provided with a stuffing-box and receiving the end of said pipe, a casing having a conical bore and provided with supply and exhaust passages, a stuffing-box for said casing and said center piece, a lever secured to said valve at or near its center, and means for holding said lever in different positions, substantially as described.

In testimony whereof I affix my signature in presence of two witnesses.

ANTHONY PATTERSON.

Witnesses:
CLARA EMILY WAKEFORD,
STANLEY RALPH PATTERSON.